Nov. 2, 1971 R. C. MARSH 3,616,624

LAMINAR FLOW WORK BENCH

Filed Nov. 4, 1969 3 Sheets-Sheet 1

INVENTOR
ROBERT CLAUDE MARSH
BY
Kane, Dalsimer, Kane, Sullivan & Kurucz
ATTORNEYS Nov. 2, 1971 R. C. MARSH 3,616,624

LAMINAR FLOW WORK BENCH

Filed Nov. 4, 1969 3 Sheets-Sheet 2

INVENTOR
ROBERT CLAUDE MARSH
BY
Kane, Dalsimer, Kane, Sullivan & Kurucz
ATTORNEYS INVENTOR
ROBERT CLAUDE MARSH
BY
Kane, Dalsimer, Kane, Sullivan & Kurucz
ATTORNEYS 3,616,624
LAMINAR FLOW WORK BENCH Robert Claude Marsh, Albuquerque, N. Mex., assignor to Becton, Dickinson and Company, East Rutherford, N.J.

Filed Nov. 4, 1969, Ser. No. 874,009
Int. Cl. B01d 46/02
U.S. Cl. 55—472 4 Claims

ABSTRACT OF THE DISCLOSURE

A dust free work bench is provided comprising a cabinet containing a blower and prefilter and having an opening to receive a work area enclosure and a removable work area enclosure including a high efficiency particulate air filter. The HEPA filter is presealed to the work area so that leakage can be tolerated between the cabinet and enclosure without resulting in contamination of the air flow within the enclosure.

BACKGROUND OF THE INVENTION

Laminar air flow clean benches are widely used where a particle free, bio-clean environment is required as, for example, in the fabrication of electronic components, the assembly and packaging of small parts, sterile packaging stations, camera and watch repair stations, etc. such benches utilize a lower which draws in ambient air through a prefilter which is on the order of 40% efficient and delivers the air in a laminar flow pattern to the work area with particles of 0.3 micron size or larger removed with over 99.9% efficiency by means of a high efficiency particulate air (HEPA) final filter.

The seal between the HEPA filter and work enclosure is most critical since even the slightest leak would result in a high concentration of contaminants entering the work area and thus heretofore elaborate clamping mechanisms and gaskets had to be provided to insure against filter bypass to the work area. When the HEPA filter was spent and had to be replaced, a skilled technical was required to insure that the replacement filter was properly sealed in position. This is a costly and time consuming procedure which requires well trained and hence highly paid personnel. It also required that facilities be provided at the bench site to test the effectiveness of the seal or that the bench be periodically moved to such a test facility. Such prior art work benches are also limited in that the position of the final filter is fixed with respect to that of the prefilter and work area and hence the air flow pattern is predesigned and cannot be readily altered.

It is the principal object of the present invention to provide a clean air work bench which overcomes the aforementioned shortcomings of existing laminar flow benches by providing a bench with a removable work enclosure which includes the HEPA filter. The enclosure may be formed integrally with the filter frame or the filter frame may be sealed to the enclosure in a conventional manner but in either case the seal between the enclosure and the remainder of the bench would not effect the quality of air flow within the enclosure. In either case, the seal between the filter and the work enclosure is accomplished at the downstream side of the filter and does not seal against the higher air pressure of the air supply blower. The seal must only prevent air aspiration due to air movement inside the enclosure. The high pressure seal is between the filter and the cabinet where it is relieved to the outside of the work enclosure and thus in a noncritical area.

SUMMARY OF THE INVENTION

The above and other beneficial objects and advantages are attained in accordance with the present invention by providing a work bench utilizing laminar flow sweeping principles to provide a dust-free environment with a work enclosure. The bench comprises a hollow cabinet having first and second interconnected interior portions and an opening in the cabinet front providing access to the cabinet first portion. A prefilter and blower are provided mounted to the cabinet and designed to draw air into the cabinet second portion and direct the air so drawn toward the cabinet first portion in a laminar flow pattern. The work enclosure comprises an integral unit having interconnected and sealed side walls, top and bottom walls, and a rear wall. The top of the bottom wall provides a work deck and the front surface is completely or partially open to provide access to the work deck. The enclosure extends through the access opening in the cabinet front into the cabinet first portion and is removably coupled to the cabinet by means of set screws or other fastening devices. A high efficiency particulate air filter (HEPA) is provided mounted and sealed to one surface of the enclosure whereby the passage of air from the prefilter into the work enclosure is directed by the blower through the HEPA filter. The frame of the HEPA filter may be formed integrally with the sides of the enclosure or, alternatively, the filter may be suitably connected to the enclosure to effect, a leakproof seal between the enclosure and the filter.

DETAILED DESCRIPTION OF THE PREFERRED EMBODIMENTS

Figure 1:
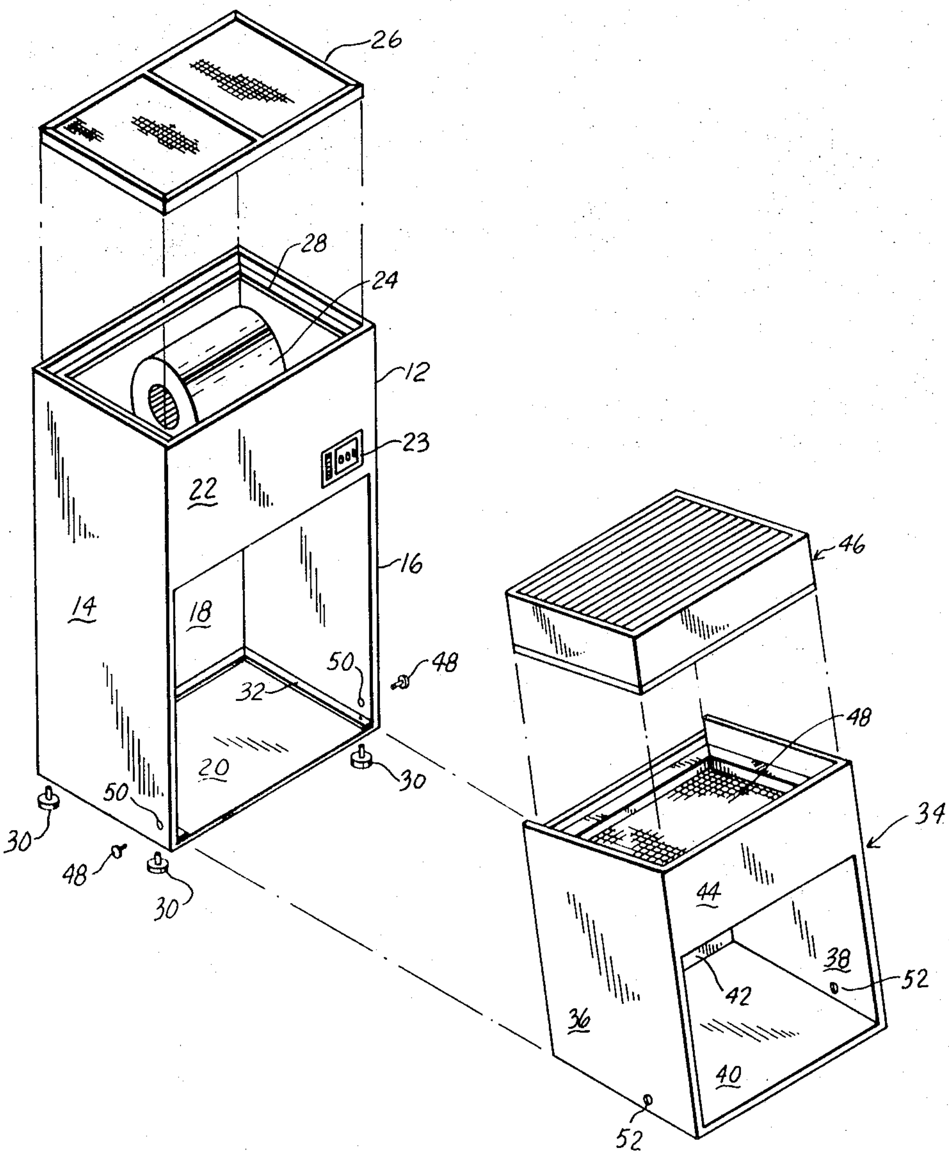
FIG. 1 is an exploded perspective view of a laminar flow clean bench in accordance with the present invention.

The present invention is illustrated in the accompanying drawings wherein similar components bear the same referenced numeral throughout the several views. Reference is now made to FIG. 1 in particular wherein the laminar flow clean bench 10 of the present invention is illustrated as comprising a cabinet 12 having side walls 14 and 16, rear wall 18, base 20 and front panel 22. As shown, the lower portion of front panel 22 is removed to provide access to the interior of the cabinet and a control panel 23 is mounted on the front panel. The control panel includes switches for operating the blower and light fixture. As will be described in more detail forthwith, the cabinet further includes means for mounting a blower 24 in the upper portion thereof and the top edges of the cabinet are suitably channeled to receive a prefilter 26 which seats in the channels 28 and thereby provides a top cover for the cabinet. The cabinet is mounted on adjustable leveling feet 30 which extend into structural channels 32 about the lower periphery of bottom panel 20.

An enclosed structure 34 is also provided for insertion within cabinet 10 through the opening in the front surface 22. The enclosure 34 which is formed of wood, plastic or other continuous material includes integrally constructed or molded side walls 36 and 38, rear panel 42, and front panel 44. A major portion of front panel 44 is removed to provide access to the interior of the enclosure 10. The top of the enclosure 34 is covered with a high efficiency particulate air (HEPA) filter 46 contained within frame 64. The frame is designed to sealingly engage the sides and front and rear surfaces of the enclosure. A protective screen 48 covers the inner surface of the filter.

Figure 2:
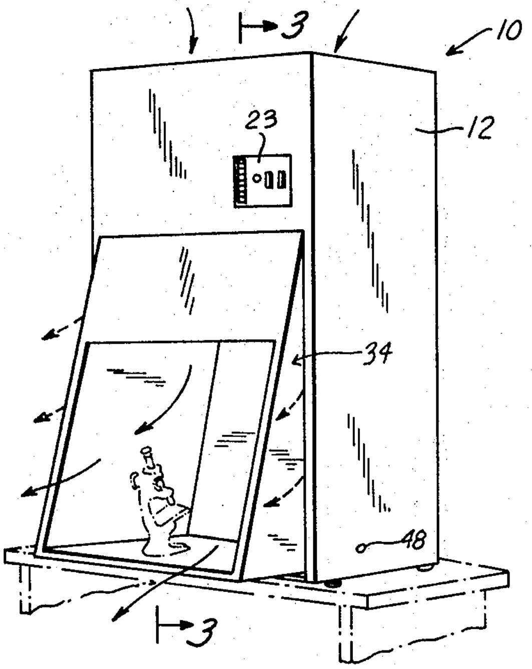
FIG. 2 is a perspective view of the bench of FIG. 1 in assembled condition.
Figure 3:
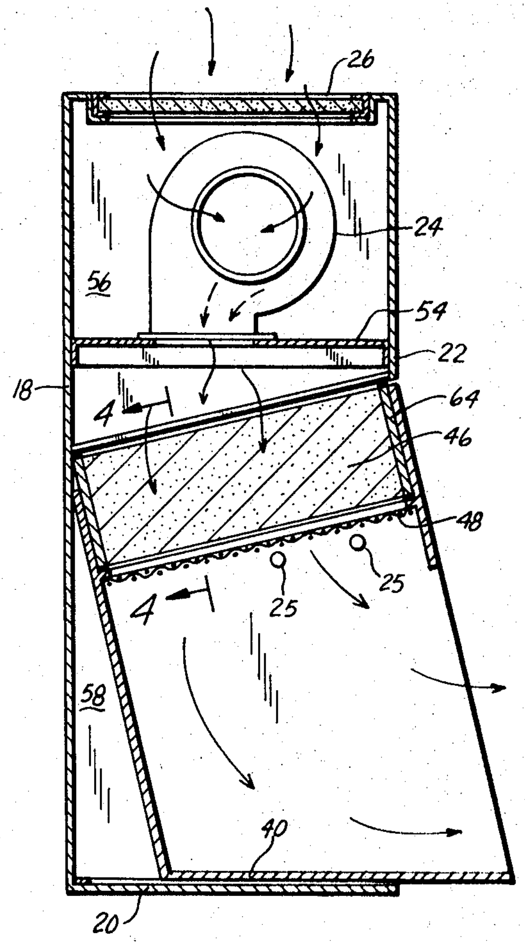
FIG. 3 is a side elevational sectional view taken along reference lines 3—3 of FIG. 2 in the direction indicated by the arrows.

Reference is now made to FIG. 2 wherein the work bench is illustrated in assembled condition. As shown, the width of the enclosure 34 is substantially equal to that of the cabinet thereby allowing the enclosure to be positioned within the cabinet. The enclosure is secured to the cabinet with set screws 48 are designed to pass through suitable openings 50 in the cabinet wall to engage screw receiving portions 52 of the enclosure side wall. When assembled, the front face 44 of the enclosure extends outwardly from the cabinet at an angle of between 12 and 15 degrees so as to provide better visibility of the work deck which comprises the top surface of base 40. It has been found that this angular relationship tends to minimize turbulence and the entrainment of outside contaminated air when the bench is in operation. Referring now to FIG. 3, it may be noted that a partition 54 is provided within the cabinet generally dividing the interior of the cabinet into two portions, a first or top portion 56 and a second or bottom portion 58. Blower 24 is mounted to the partition and serves to draw air through prefilter 26 into the first compartment and thereafter direct the air in a laminar flow pattern into the second compartment 58. The blower is operatively connected to one of the switches on panel 23, the other switch controls a light source 25 disposed within the enclosure. In this regard, suitable electrical connections (not shown) must be made between the control panel and light source.

The enclosure 34 is positioned within the second cabinet with the HEPA filter 46 extending between the front surface 22 and rear surface 18 and also between side walls 14 and 16. To this end, the length of the enclosure, that is, the distance between the front and rear surfaces, is sufficiently greater than that of the cabinet to describe an angle of between 12° and 15° when the enclosure is positioned within the cabinet. The output of the blower is directed through the HEPA filter and thence through the enclosure and out the opening in the front of the enclosure.

Figure 4:
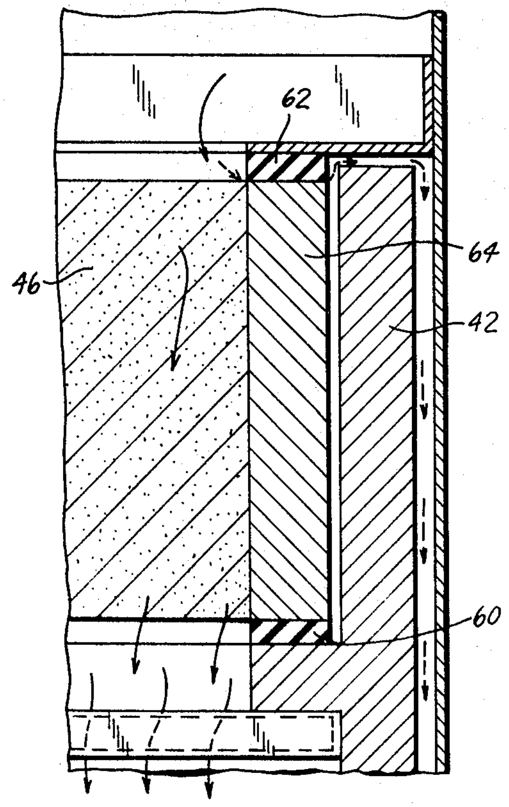
FIG. 4 is an enlarged fragmentary sectional view taken along reference lines 4—4 of FIG. 3 in the direction indicated by the arrows illustrating one embodiment of the relationship between the high efficiency particulate air filter and the bench enclosure wherein conventional high pressure gasket means are utilized to seal the filter frame and enclosure.

Reference is now made to FIG. 4 wherein one embodiment of the enclosure construction is illustrated. In this embodiment the HEPA filter 46 is sealed to the walls of the enclosure 42 with a suitable high pressure gasket 60 so that no leakage can occur between the filter and the walls of the enclosure thereby insuing that the only air entering the enclosure is through the HEPA filter. An additional gasket 62 is provided about the top peripheral edge of the enclosure so that when the enclosure is slid into the cabinet the top surfaces of the enclosure compress gasket 62. Leakage at gasket 62 is of no consequence since gasket 60 would prevent any leaked air from entering the enclosure and thus air leaking past gasket 62 would be directed out of the cabinet between the outer surfaces of the enclosure and the interior surfaces of the cabinet as shown in phantom in FIGS. 2 and 4.

Figure 5:
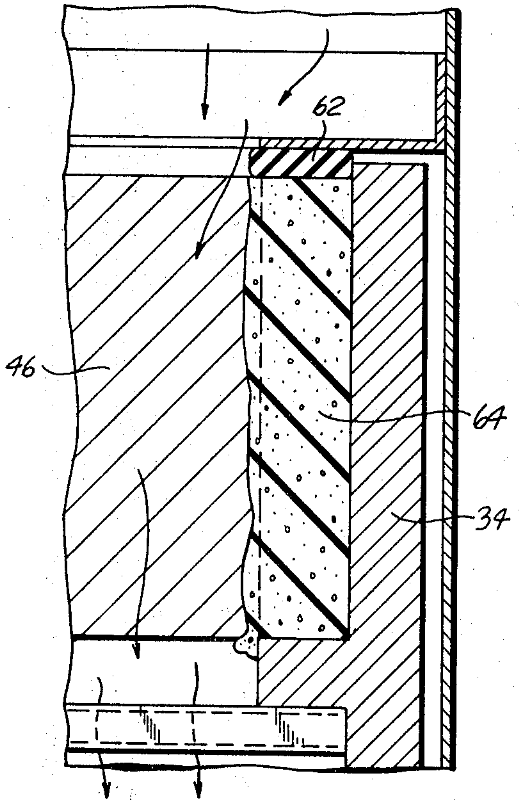
FIG. 5 is a fragmentary sectional view similar to FIG. 4 illustrating an alternate embodiment wherein the filter frame is formed integrally with the enclosure.

In FIG. 5 the need for the leak-proof seal 60 of the embodiment of FIG. 4 is eliminated by forming the HEPA filter frame 64 integral with the walls of the enclosure 34. That is, the sides of the frame are extended to form the enclosure. As in the primary embodiment, a gasket 62 is provided for positively positioning the enclosure within the cabinet, cooperating in securing the enclosure in position, and limiting the amount of air by-pass, but once again leakage past gasket 62 is immaterial since any air leaking gasket 62 could not enter the enclosure and the only air flowing through the enclosure would pass through filter 46. This is so because in either case, the seal between the filter and the work enclosure is accomplished at the downstream side of the filter and does not seal against the higher air pressure of the air supply blower. The seal must only prevent air aspiration due to air movement inside the enclosure. The high pressure seal is between the filter and the cabinet where it is relieved to the outside of the work enclosure and thus in a noncritical area.

Figure 6:
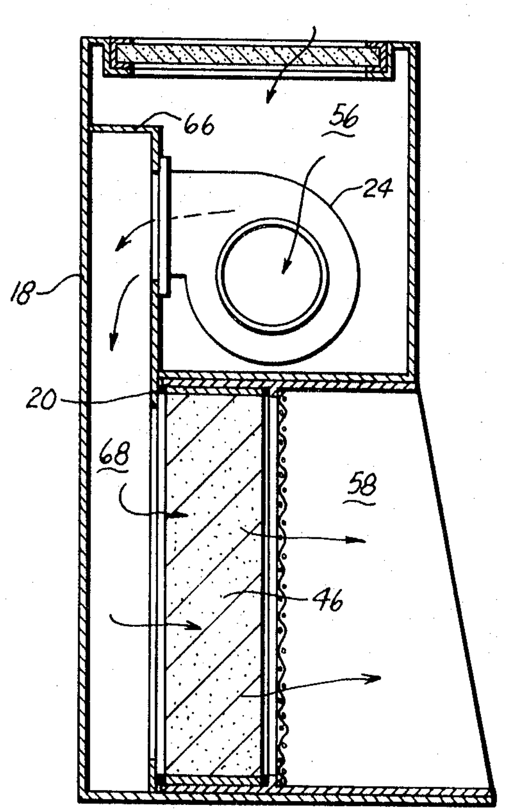
FIG. 6 is a side elevational sectional view similar to FIG. 3 illustrating an alternate embodiment of the present invention designed to provide horizontal air flow within the enclosure.

In the foregoing description the air flow sweep pattern of the work bench described is generally diagonal since the air enters the enclosure at the top and exits out the front. In FIG. 6 an alternate embodiment of the work bench assembly is illustrated wherein the components have been rearranged so that the flow through the cabinet is substantially horizontal. In this alternate embodiment the HEPA filter 46 is substantially vertical and the flow through the filter is horizontal. To achieve this horizontal flow, the blower 24 is mounted substantially horizontally to vertical partition 66 within the compartment. Partition 66 is spaced inwardly of the rear wall 18 of the cabinet and cooperates with the rear wall in defining a plenum chamber extending between the first portion of the cabinet interior and the second portion of the cabinet interior. The HEPA filter 46 extends through partition 66 into the plenum. Again the enclosure is formed integrally with the frame of the HEPA filter or is positively sealed to the filter so as to prevent any by-pass. A gasket 70 is provided between the filter and the cabinet to limit the by-pass past the enclosure but leakage passed this gasket is inconsequential with regard to the enclosure interior since any such leakage would not result in contamination of the air within the enclosure.

Thus, in accordance with the above an improved clean air bench is provided which attains the aforementioned objectives.

Having thus described my invention, what is claimed is:

1. A laminar flow clean bench comprising in combination: a hollow cabinet having front, bottom, side and rear walls and an inlet; an access opening in said front wall; a prefilter mounted within said cabinet to filter air from the inlet; a blower mounted within said cabinet downstream of the prefilter to draw air into said cabinet interior through said inlet and through the prefilter; an enclosure formed of sealingly interconnected front, rear, top, side and bottom walls, said bottom wall of the enclosure defining a work deck; an inlet opening and an outlet opening in said enclosure; said enclosure being slideably received in said cabinet interior through said cabinet access opening with the enclosure inlet and outlet openings being in air flow communication with the blower output, said enclosure outlet opening being aligned with said cabinet access opening to provide access to said work deck and said enclosure walls being in closely fitted relationship with said cabinet walls; a high efficiency particulate air filter in the enclosure across the enclosure inlet opening to pass filtered air to the outlet opening and sealed to said enclosure walls in the flow path of said blower output providing for the passage of air from the blower output to the enclosure interior whereby air enters the prefilter, passes through the high efficient particulate air filter and across the work deck; and means for removably coupling said enclosure to said cabinet.

2. The invention in accordance with claim 1 wherein said high efficiency particulate air filter is contained within a filter frame and said structure is formed integrally with the filter frame.

3. The invention in accordance with claim 1 wherein said high efficiency particulate air filter is positively sealed against leakage to said enclosure with a high pressure gasket.

4. The invention in accordance with claim 1 wherein said cabinet walls are disposed mutually perpendicular to one another and said enclosure front surface describes an angle of between 12 and 15 degrees with said cabinet front surface.

References Cited

UNITED STATES PATENTS

| | | | |
|---|---|---|---|
| 3,158,457 | 11/1964 | Whitfield | 55—472 |
| 3,249,037 | 5/1966 | Stalker | 55—481 |
| 3,318,076 | 5/1967 | Baker | 55—AC |
| 3,363,539 | 1/1968 | Taylor et al. | 55—472 |
| 3,426,512 | 2/1969 | Nesher | 55—AC |
| 3,470,679 | 10/1969 | Ramsey | 55—473 |
| 3,494,113 | 2/1970 | Kinney | 55—481 |
| 3,509,697 | 5/1970 | Dewey et al. | 55—385 |

FRANK W. LUTTER, Primary Examiner

B. NOZICK, Assistant Examiner

U.S. Cl. X.R.

55—480, 482, 502; 98—115 LH

UNITED STATES PATENT OFFICE

CERTIFICATE OF CORRECTION

Patent No. 3,616,624 Dated Nov. 2, 1971

Inventor(s) Robert Claude Marsh

It is certified that error appears in the above-identified patent and that said Letters Patent are hereby corrected as shown below:

Col. 1, line 41 "technical" should be --technician--

Col. 3, line 19, after "screws 48" insert --which--

Signed and sealed this 20th day of November 1973.

(SEAL)
Attest:

EDWARD M.FLETCHER,JR.
Attesting Officer

RENE D. TEGTMEYER
Acting Commissioner of Patents